US012687130B2

(12) United States Patent
Zsiga et al.

(10) Patent No.: US 12,687,130 B2
(45) Date of Patent: Jul. 21, 2026

(54) ACCESSORY GEARBOX AND AIRCRAFT TURBINE ENGINE COMPRISING SUCH A BOX

(71) Applicant: SAFRAN AIRCRAFT ENGINES, Paris (FR)

(72) Inventors: Zoltan Zsiga, Moissy-Cramayel (FR); Gabriel Aloys Karcher, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/859,445

(22) PCT Filed: Apr. 26, 2023

(86) PCT No.: PCT/FR2023/000057
§ 371 (c)(1),
(2) Date: Oct. 23, 2024

(87) PCT Pub. No.: WO2023/209291
PCT Pub. Date: Nov. 2, 2023

(65) Prior Publication Data
US 2025/0283434 A1 Sep. 11, 2025

(30) Foreign Application Priority Data
Apr. 28, 2022 (FR) ...................................... 2204026

(51) Int. Cl.
*F02C 7/32* (2006.01)
*F02C 7/268* (2006.01)

(52) U.S. Cl.
CPC ................ *F02C 7/32* (2013.01); *F02C 7/268* (2013.01); *F05D 2260/40311* (2013.01)

(58) Field of Classification Search
CPC ...... F02C 7/32; F02C 7/36; F02C 7/26; F02C 7/275; F02C 7/277; F02C 3/04
See application file for complete search history.

(56) References Cited

U.S. PATENT DOCUMENTS

| | | | | |
|---|---|---|---|---|
| 2,663,994 A | * | 12/1953 | Lombard | ................ F02C 7/275 60/788 |
| 5,309,708 A | * | 5/1994 | Stewart, Jr. | ............... F02C 7/32 60/39.15 |
| 10,233,998 B2 | * | 3/2019 | Prunera-Usach | ..... F16H 1/2854 |

(Continued)

FOREIGN PATENT DOCUMENTS

| | | |
|---|---|---|
| FR | 1503366 A | 11/1967 |
| FR | 2045805 A1 | 3/1971 |
| WO | 2008082335 A1 | 7/2008 |

OTHER PUBLICATIONS

Search Report and Written Opinion issued in International Application No. PCT/FR2023/000057, mailed Aug. 31, 2023.

*Primary Examiner* — Thuyhang N Nguyen
(74) *Attorney, Agent, or Firm* — Bookoff McAndrews, PLLC

(57) ABSTRACT
Accessory gearbox for an aircraft turbine engine, including: a casing, a reduction gear, and a freewheel which are permanently integrated into the casing, the accessory gearbox being configured to interface with a starter of the turbomachine that is intended to start up the turbomachine, the reduction gear and the freewheel being dedicated to the starter of the turbomachine.

20 Claims, 4 Drawing Sheets

(56)                   References Cited

U.S. PATENT DOCUMENTS

| | | | |
|---|---|---|---|
| 2007/0089420 A1 | 4/2007 | Klingels | |
| 2016/0146291 A1* | 5/2016 | Prunera-Usach | F16H 1/2854 |
| | | | 475/331 |
| 2017/0234232 A1* | 8/2017 | Sheridan | F02C 7/32 |
| | | | 307/9.1 |
| 2018/0058330 A1* | 3/2018 | Munevar | F02K 3/06 |
| 2019/0077514 A1* | 3/2019 | Silet | B64D 13/02 |

* cited by examiner

[Fig. 1]
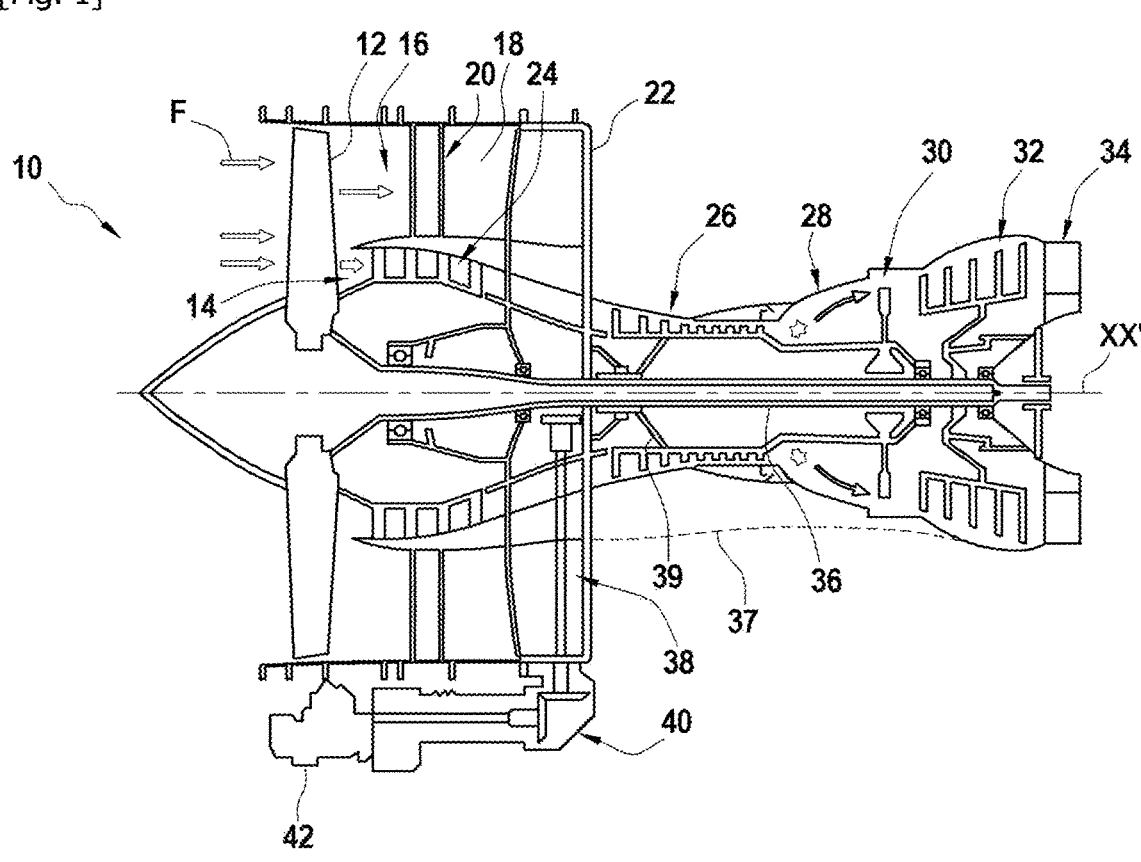
[Fig 2A]
*(PRIOR ART)*
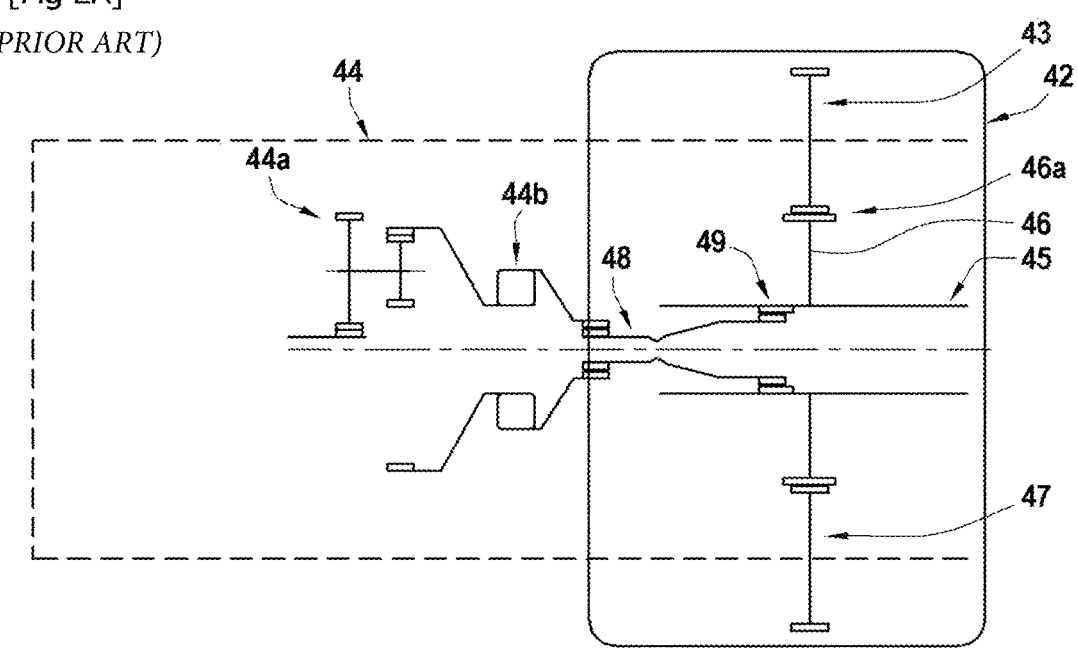

[Fig. 2B]
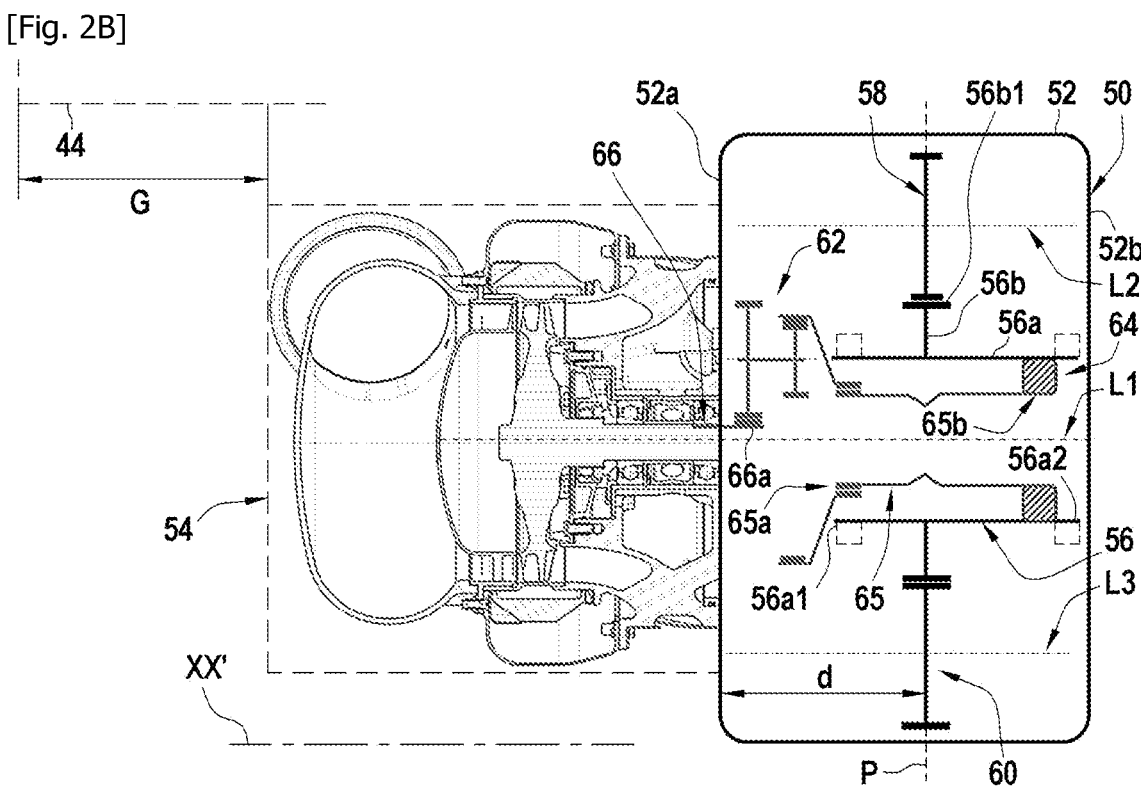
[Fig. 3]

[Fig. 6]
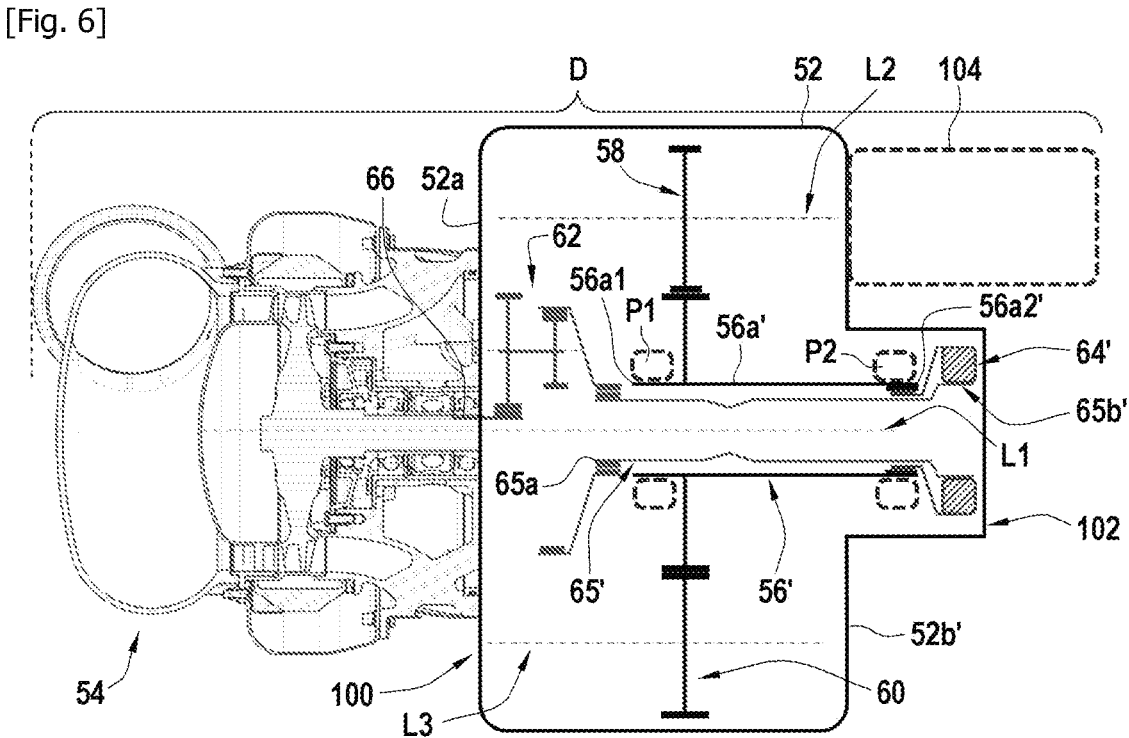

ACCESSORY GEARBOX AND AIRCRAFT TURBINE ENGINE COMPRISING SUCH A BOX

CROSS-REFERENCE TO RELATED APPLICATIONS

This is a National Stage Application under 35 U.S.C. § 371 of International Application No. PCT/FR2023/000057, filed Apr. 26, 2023, now published as WO 2023/209291 A1, which claims priority to French Patent Application No. 2204026, filed on Apr. 28, 2022, the entireties of which are incorporated herein by reference.

TECHNICAL FIELD

The present disclosure relates to an accessory gearbox for an aircraft turbomachine and to an aircraft turbomachine comprising such an accessory gearbox.

PRIOR ART

Known aircraft turbomachines generally comprise an accessory gearbox or AGB which uses the movement of the drive shaft to drive various accessories such as fuel pumps, electric generators, lubrication unit, starter, oil separator and other members that constitute the set of the auxiliary equipment of the engine and of the aircraft power generation.

FIG. 1 illustrates, in a longitudinal section, a known architecture of an aircraft turbomachine (here, for example, it is a turbofan engine) of longitudinal shape centered about a longitudinal axis XX'. The turbomachine 10 generally comprises, successively from upstream to downstream in the direction of circulation of the air stream illustrated by the arrows F (i.e. from left to right in the figure), a fan 12 which provides air to a primary path 14 and to a secondary path 16 producing most of the thrust force of the turbomachine, and which is arranged coaxially relative to the primary path 14 in an annular duct 18. This duct 18 successively comprises, from upstream to downstream, stator vanes 20 and an intermediate structural casing 22.

The primary path 14 successively comprises, from upstream to downstream, one or more low-pressure compression stages 24, one or more high-pressure compression stages 26, a combustion chamber 28, one or more high-pressure turbine stages 30, one or more low-pressure turbine stages 32 and an exhaust casing whose structural arms 34 are visible.

As represented in the figure, a low-pressure drive shaft 36 connects the low-pressure turbine 32 to the low-pressure compressor 24 and to the fan 12.

A radial shaft 38 (housed in an arm of the intermediate casing 22) extends from a high-pressure drive shaft 39 (which connects the high-pressure turbine 30 to the high-pressure compressor 26) to a bevel gearbox 40 which, in turn, is connected to an accessory gearbox 42.

Thus, the movement is transmitted to the accessory gearbox 42 from the high-pressure drive shaft 39, via the radial shaft 38 and the bevel gearbox 40.

In this type of turbomachine architecture there is a permanent need to reduce the space requirement of the various components and in particular of the accessory gearbox equipped with its accessories.

Indeed, the axial space requirement of an accessory, i.e. the space requirement of this accessory in an axial direction parallel to the longitudinal axis XX' of the turbomachine, may be prohibitive for the installation of the accessory gearbox in a turbomachine, whether in an inter-path compartment (see reference 37 in FIG. 1) or in a fan compartment as it is the case in the figure.

The present invention thus aims to reduce the overall axial space requirement of the accessory gearbox equipped with accessories.

DISCLOSURE OF THE INVENTION

To this end, the present invention proposes a configuration of an accessory gearbox for an aircraft turbomachine that makes it possible in particular to achieve this aim, the accessory gearbox being configured to interface with a starter of the turbomachine intended to start up the turbomachine, the accessory gearbox comprising:

a casing comprising first and second opposing walls, the first wall being intended to interface with the starter of the turbomachine, a reduction gear and a freewheel which are permanently integrated into the casing and dedicated to the starter of the turbomachine, a shaft line L1 in the casing which is dedicated to the starter and which includes a pinion shaft extending between the first and second opposite walls, in an axial direction perpendicular to the first wall, the pinion shaft including two opposite ends, a first end of which is disposed on the side of the first wall of the casing and a second end of which is disposed on the side of the second opposite wall of the casing, the freewheel dedicated to the starter being disposed in the casing on the side of the second end of the pinion shaft.

The integration in the casing of the accessory gearbox of the reduction gear and of the freewheel dedicated to the starter of the turbomachine and which, normally, are integrated into this starter, makes it possible to reduce the overall axial space requirement of the accessory gearbox equipped with the starter. Particularly, the axial space requirement of the starter is thus reduced. This arrangement thus makes it possible to more easily install the accessory gearbox at different locations in the turbomachine, in particular in the inter-path compartment or in the fan compartment. Moreover, this arrangement makes it possible to leave room for the installation of the reduction gear on the side of the first wall.

According to other possible characteristics:

the first wall of the casing including an area which is intended to be crossed by an output shaft of the starter, the pinion shaft and the freewheel both being coaxial with respect to an axis passing inside this area of the wall; this axis is aligned with the output shaft of the starter which passes through the wall in the concerned area;

the freewheel is mounted inside the pinion shaft;

the second opposite wall of the casing is externally equipped with a hand crank port (HCP) disposed in the axial alignment of the shaft line dedicated to the starter and which is configured to allow, on command, when the turbomachine is stopped on the ground, the manual driving of a gear system internal to the casing;

the hand crank port (HCP) is connected to a driving shaft connected to the freewheel dedicated to the starter;

the accessory gearbox comprises a rotating seal between the hand crank port (HCP) and the driving shaft;

the accessory gearbox comprises inside the casing a transmission shaft extending axially inside the pinion shaft between a first end coupled to the reduction gear and a second opposite end which extends to the second opposite wall of the casing to be coupled to equipment external to the casing;

the second opposite end of the transmission shaft is intended to be coupled to an oil pump external to the casing;

the second opposite end of the transmission shaft is intended to be coupled to an electric motor external to the casing and which is dedicated to the operation of the turbomachine when the aircraft is on the ground (ETM);

the freewheel is mounted outside the pinion shaft;

the second opposite wall of the casing includes an external protrusion which extends axially away from the casing and which makes it possible to house the freewheel;

the accessory gearbox comprises at least one other shaft line which extends parallel to the axial direction of the shaft line of the starter and which is intended to interface with another accessory, the second opposite wall of the casing being intended to interface with this other accessory;

the pinion shaft carries a web which is provided at its periphery with a toothing and which is disposed at a distance between the two opposite ends of the pinion shaft, the freewheel being disposed between the web and the second opposite wall of the casing; this arrangement of the web makes it possible to drive (via the gear train coupled to one or more transmission shaft lines) accessories disposed on the side of each of the two opposite walls of the gearbox, which thus balances the bearing surfaces on the shaft line(s);

the web is disposed between the reduction gear and the freewheel;

the reduction gear is disposed in the casing on the side of the first end of the pinion shaft;

the reduction gear is disposed outside the pinion shaft;

the reduction gear is disposed between the first end of the pinion shaft and the first wall of the casing;

the reduction gear is coupled to a fusible member disposed inside the pinion shaft.

The invention also relates to an assembly comprising an accessory gearbox for an aircraft turbomachine as briefly set out above and a starter interfacing with the gearbox, the starter comprising an output shaft disposed coaxially with the pinion shaft.

The invention further relates to an aircraft turbomachine comprising an accessory gearbox for an aircraft turbomachine as briefly set out above or an assembly as briefly set out above.

BRIEF DESCRIPTION OF THE DRAWINGS

Other characteristics and advantages of the object of the present disclosure will emerge from the following description of embodiments, given as non-limiting examples, with reference to the appended figures.

FIG. 1 is a schematic view in longitudinal section of a turbojet engine according to the prior art;

FIG. 2A is an enlarged schematic view of the accessory gearbox of FIG. 1 to which a starter is fixed;

FIG. 2B is a schematic view similar to that of FIG. 2A showing a new arrangement of an accessory gearbox and of a starter according to one exemplary embodiment of the invention;

FIG. 3 is a schematic view similar to that of FIG. 2B showing an accessory gearbox according to another possible exemplary embodiment;

FIG. 4 is a schematic view similar to that of FIG. 2B showing an accessory gearbox according to another possible exemplary embodiment;

FIG. 5 is a schematic view similar to that of FIG. 2B showing an accessory gearbox according to one possible exemplary embodiment;

FIG. 6 is a schematic view similar to that of FIG. 2B showing an accessory gearbox according to another possible exemplary embodiment.

DETAILED DESCRIPTION

The present invention applies in particular to an aircraft turbomachine such as the one represented in FIG. 1 and described above.

However, the invention may apply to other turbomachines such as, for example, a single-spool turbomachine, an unducted fan turbomachine, a triple-spool machine, a gas turbine, a helicopter turboshaft engine, etc.

FIGS. 2A and 2B are comparative schematic views that illustrate the principle underlying the invention.

More particularly, FIG. 2A (prior art) schematically represents, according to an axial view taken along an axis parallel to the longitudinal axis XX' of the turbomachine illustrated in FIG. 1 (axis laterally offset relative to the axis XX'), the accessory gearbox 42 equipped with a turbomachine starter 44 disposed externally to the gearbox and axially shifted relative to the gearbox on its left. Only the reduction gear 44a and the freewheel 44b of the starter 44 are visible in the figure and are represented very schematically inside the starter which is symbolized by dotted lines. In a known manner, the starter 44 is intended to start up the turbomachine so that the drive shaft reaches a sufficient rotation speed.

In general, the accessory gearbox 42 comprises a shaft line dedicated to the starter 44, comprising a pinion shaft 45 extending axially inside the gearbox and which includes, at the outer periphery of the web 46 of the pinion, a toothing 46a making it possible to mesh with other gear elements of the gear train of the gearbox, two elements of which, denoted 43 and 47, are represented in the figure, arranged on two other parallel shaft lines.

As represented in FIG. 2A, the reduction gear 44a of the starter 44 is connected to the inlet of the freewheel 44b which, in turn, is connected to one end of a fusible keel which can be associated with a decoupler, which are jointly represented by the reference 48 at the level of a wall of the accessory gearbox 42 which is located at the interface between the starter and the gearbox. The fusible keel 48 is disposed inside the gearbox. It protects against overtorques and locally has a section reduction (frangible area) which is configured to break in the event that the mechanical torque applied by the starter to the accessory gearbox exceeds a predetermined threshold. The decoupler serves, for its part, to limit the mechanical torque applied by the accessory gearbox to the starter. It will be noted that the fusible keel and the decoupler have different threshold values.

The other end of the assembly formed by the fusible keel and the decoupler 48 is connected to the inside of the pinion shaft 45 via a splined interface 49.

FIG. 2B illustrates the principle of the invention applied to the configuration of FIG. 2A and shows how this configuration is modified.

The references used for the elements of FIG. 2A have been modified insofar as the accessory gearbox and the starter have both been modified.

The accessory gearbox 50 comprises a casing 52 inside which are housed the various elements of the gear train for driving the different accessories mounted on the casing, from the bevel gearbox 40 of FIG. 1.

The gearbox 52 comprises two opposite walls, namely a first wall 52*a* and a second opposite wall 52*b* axially spaced apart from each other in the axial direction parallel to the longitudinal axis XX' of the turbomachine (the axis XX' is represented in FIG. 2B only to recall the axial orientation but its location on the turbomachine of FIG. 1 is different as indicated in FIG. 1).

The first wall 52*a* is intended to interface with the starter 54 known from the turbomachine surrounded here by dotted lines but represented in more detail than in FIG. 2A.

The accessory gearbox 50 comprises, inside the casing 52, a shaft line L1 dedicated to the starter 54 and which includes a pinion 56 comprising a pinion shaft 56*a* extending between the two opposite walls 52*a* and 52*b*, parallel to the axial direction of the shaft line L1 (and therefore perpendicular to the walls). The pinion shaft 56*a* is hollow and includes two opposite ends, a first end 56*a*1 of which is disposed on the side of the first wall 52*a*. The second opposite end 56*a*2 is, for its part, disposed on the side of second opposite wall 52*b* of the casing.

The pinion 56 also comprises, at a distance between the two opposite ends 56*a*1 and 56*a*2, a pinion web 56*b* which extends radially (in a transverse plane perpendicular to the shaft line L1) and away from the pinion shaft 56*a*. The pinion web 56*b* includes, at its outer periphery, a toothing 56*b*1 making it possible to mesh with other gear elements 58 and 60 (e.g.: pinions) disposed, inside the casing, along other driving shaft lines respectively L2 and L3 which are here represented parallel to the shaft line L1. These other driving shaft lines can be used to drive other accessories (not represented here) mounted on the casing 50. Particularly, thanks to the position of the web 56*b* on the pinion shaft 56*a* which is such that the web is more or less in a centered position relative to the two opposite walls 52*a*, 52*b* of the casing, accessories can be disposed on both sides of the walls (and in particular on the starter side) without creating a problem of balancing the loads on the driving shafts of these accessories.

The casing 52 of the accessory gearbox 50 integrates a reduction gear 62 and a freewheel 64 which are both dedicated to the starter 54 of the turbomachine, unlike FIG. 2A, where the reduction gear 44*a* and the freewheel 44*b* are housed inside the starter 44 itself.

As represented in FIG. 2B, the freewheel 64 is disposed in the casing 52 on the side of the second end 56*a*2 of the pinion shaft 56*a* and is engaged with the pinion shaft. More particularly, the freewheel 64 is disposed between the web 56*b* and the second wall 52*b* of the casing. The reduction gear 62 is, for its part, disposed on the side of the first end 56*a*1 of this shaft and, more particularly, between this first end and the first wall 52*a*, in particular outside the shaft.

In the exemplary embodiment represented in FIG. 2B, the freewheel 64 is represented mounted inside the pinion shaft 56*a* but it can however be mounted externally to this shaft.

Moreover, the reduction gear 62 is here connected to one end 65*a* of a fusible keel and of a decoupler jointly represented by the reference 65 and disposed inside the casing 52.

The other end 65*b* of the assembly 65 is connected to the freewheel 64, for example to the hub of the freewheel while the external body of the freewheel is connected to the pinion shaft 56*a*.

On the side of the reduction gear 62 which is oriented facing the first wall 52*a*, a shaft 66 secured to the starter 54, for example the shaft of the air turbine of the starter, passes through an area of the first wall 52*a* to partially penetrate inside the casing via a through end 66*a*. This end 66*a* is provided with a toothing or any other means for meshing or coupling with one of the pinions of the reduction gear 62. The reduction gear generally has an epicyclic train structure and many architectures can be envisaged. The end 66*a* of the shaft (the sun gear) is connected to planet gears, the number of which can be comprised between 1 and 5 (in practice more often 3), which can have two stages (two toothings as in the figure) or a single stage (a single toothing in a configuration not represented). These planet gears mesh on a ring gear which is connected here to the end 65*a* of the fusible keel (by splines). In this configuration, the freewheel and the pinion shaft are both mounted coaxially about an (fictitious) axis which extends the output shaft 66 of the starter (in its alignment), and in particular its end 66*a*. This axis passes inside the area of the wall which is crossed by the shaft of the starter. In the present exemplary embodiment, the reduction gear of the starter has two stages and is preferably an epicyclic reduction gear, in which case at least three pinions (62*b* and 62*a*) are used at each stage in order to balance the radial forces. In this case, the end 66*a* of the output shaft 66 of the starter, provided with a toothing, acts as a sun pinion of the epicyclic reduction gear. Since the reduction gear is coaxial with the freewheel and therefore also with the pinion shaft, their common axis corresponds to the axis of the output shaft of the starter.

The permanent integration in the casing 52 of the accessory gearbox 50 of part of the starter which is formed by the reduction gear 62 and the freewheel 64 has several consequences:

- the distance between the guide bearings (represented by dotted lines at the two ends of the shaft in FIG. 2B) of the pinion shaft 56*a* of the shaft line L1 dedicated to the starter is reduced compared to the configuration of FIG. 2A;
- the diameter of the pinion shaft 56*a* (and therefore the internal diameter of the web 56*b*) is increased compared to the configuration of FIG. 2A, while the external diameter of the web or toothing diameter 56*b*1 remains unchanged;
- the length of the pinion shaft 56*a* on the side of the pinion which is oriented towards the starter 54 (i.e. on the side of the first end 56*a*1) is reduced compared to the configuration of FIG. 2A;
- the axial space requirement of the starter is reduced compared to the configuration of FIG. 2A.

Despite these modifications, the distance d between the first wall 52*a* of the casing and the plane P of the gear train of the casing is unchanged.

This arrangement also results in a gain G in the axial space requirement of the accessory gearbox 50 equipped with the starter 54 compared to the configuration of FIG. 2A.

This reduction in the axial space requirement is illustrated in FIG. 2B in which the starter 44 of FIG. 2A is partially illustrated in the upper left portion for the purposes of comparison.

FIG. 3 illustrates one exemplary embodiment according to the invention which reproduces the general configuration of FIG. 2B (the references used in FIG. 2B are reproduced for the elements which are unchanged) by adding to the accessory gearbox 70 an additional driving possibility from the shaft line L1 dedicated to the starter 54.

Particularly, a Hand Crank Port HCP, denoted 72, is mounted externally on the second wall 52b, in the axial alignment of the shaft line L1 and is configured to interface, on command, with the gear system internal to the casing and to allow, on command, the manual driving of this system. This hand crank port 72 is only used when the aircraft is on the ground, during maintenance operations.

In the configuration illustrated in FIG. 3, the port 72 is coupled to a driving shaft 74 which extends inside the casing and is connected to the freewheel 64 by one end of this shaft. The opposite end of the shaft 74 is connected to the port 72 and is used only during maintenance operations, as mentioned above. Moreover, a rotating seal 76 is mounted between the shaft 74 and the hand crank port 72.

Thus, following the starting of the turbomachine by the starter, when the starter disconnects by means of the freewheel 64, the gear train of the accessory gearbox becomes driven by the turbomachine, and consequently the HCP function is also disconnected, which makes it possible not to rotate the HCP shaft 74 during normal operation of the engine.

Thanks to the arrangement described above, the rotating seal 76 which is installed is used episodically (it does not rotate permanently), only when the HCP function is required. The sealing of the hand crank port HCP can therefore be ensured by a rotating seal whose cost and wear are relatively reduced compared to a seal that would necessarily be dimensioned for higher speeds if the HCP shaft 74 had to continue to rotate during normal operation of the engine following the starting.

Figures 4, 5:
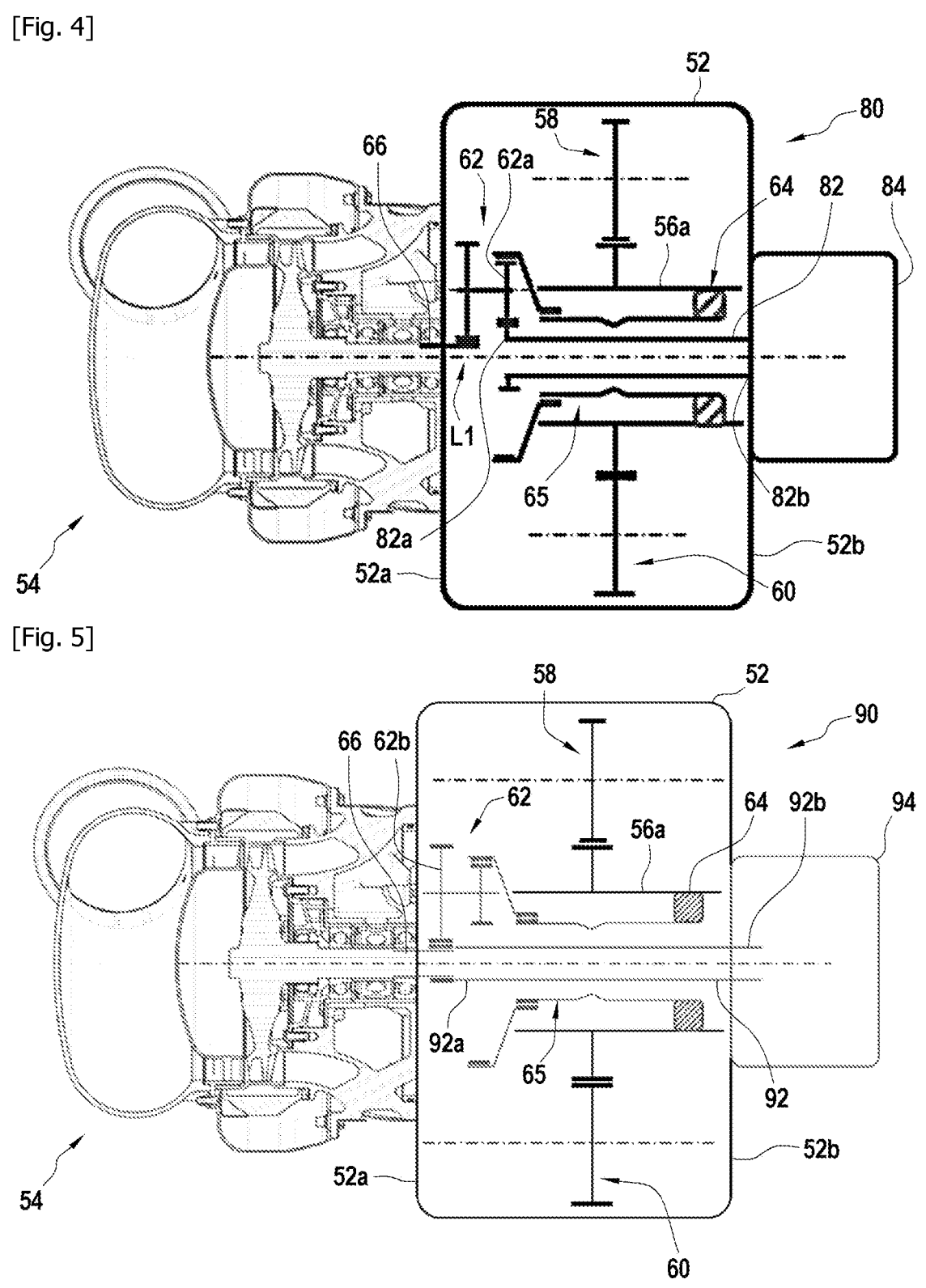

FIG. 4 illustrates one exemplary embodiment according to the invention which reproduces the general configuration of FIG. 2B (the references used in FIG. 2B are reproduced for the elements that are unchanged) by adding to the accessory gearbox 80 an additional driving possibility from the shaft line L1 dedicated to the starter 54.

More particularly, a transmission shaft 82 extends axially inside the casing 52, in particular inside the pinion shaft 56a, between a first end 82a of the shaft coupled to the reduction gear 62, in particular to a pinion 62a (this is here the second stage of a two-stage planet gear) of the reduction gear, and a second opposite end 82b. The second end 82b extends to the second opposite wall 52b of the casing (and may even protrude externally beyond the wall and therefore the casing) to be coupled to equipment external to the casing such as an oil pump 84.

The external equipment such as the oil pump 84 is thus connected to the outlet of the reduction gear 62 integrated into the accessory gearbox 80.

Such an arrangement makes it possible to drive a low-capacity pump which ensures the oil supply during a lubrication phase called marginal lubrication phase, carried out only at low speed, that is to say in particular during the starting the turbomachine or during a "motoring" phase. This phase is an engine ventilation phase during which the engine (HP shaft) is driven at low speed, on the ground, by the starter or an electric motor. This makes it possible to ventilate the combustion chamber and to prime the fuel system of the turbomachine.

Indeed, at low rotation speed of the high-pressure body of the turbomachine, in particular during the starting of the latter, the driving speed of the gear train of the accessory gearbox by the high-pressure body is insufficient for the main lubrication unit (including a main supply pump)

mounted on the gearbox to be driven at its nominal speed. The main supply pump of the unit is not properly primed or, in any case, does not provide a sufficient flow rate to ensure correct lubrication of the various members of the turbomachine that require it (in particular the reduction gear of the starter). During the engine ventilation phase, the engine rotates slowly while the pump rotates quickly (primed pump). The low-capacity pump thus provides the same flow rate as the main supply pump but at a speed 10 to 20 times lower than that of the main supply pump.

A low-capacity oil pump such as the pump 84 in FIG. 4 makes it possible to overcome this drawback.

Such a pump is generally disconnected during normal operation of the engine, i.e. when the starter is in disconnected mode. This arrangement makes it possible to take into account marginal lubrication needs without having to over-dimension the main lubrication unit of the turbomachine in order to cover such needs.

FIG. 5 illustrates another exemplary embodiment according to the invention which reproduces the general configuration of FIG. 2B (the references used in FIG. 2B are reproduced for the elements that are unchanged) by adding to the accessory gearbox 90 an additional driving possibility from the shaft line L1 dedicated to the starter 54.

More particularly, a transmission shaft 92 extends axially inside the casing 52, in particular inside the pinion shaft 56a, between a first end 92a of the shaft coupled to the reduction gear 62, in particular to a pinion 62b of the reduction gear, and a second opposite end 92b. The second end 92b extends to the second opposite wall 52b of the casing through which it passes to protrude externally beyond the wall (and therefore the casing) and to be coupled to equipment external to the casing such as an electric motor called ETM (Engine Turning Motor) 94. Such an ETM motor is used on the ground in order to rotate the drive shaft of the turbomachine at very low speed for a relatively long time, this in order to equalize the temperature of the rotor and therefore to reduce the thermal gradient present on this rotor.

The external equipment such as the motor 94 is thus connected to the inlet of the reduction gear 62 integrated into the accessory gearbox 90, an inlet which is already connected to the turbine shaft 66 of the starter as mentioned above. The reduction gear 62 is indeed used to reduce the speed between the motor 94 of the ETM which needs to rotate quickly and the shaft 56a connected to the outlet of the reduction gear 62. The shaft 92 could therefore not be connected to a pinion rotating less quickly such as the output pinion of the reduction gear.

This arrangement makes it possible to pool the reduction gear requirements of the starter 54 and of the motor 94 by eliminating the specific reduction gear of the motor 94 and allowing this motor to use the reduction gear 62 of the starter integrated into the casing 52.

Moreover, as for the previous driving configurations from the shaft line L1 dedicated to the starter, the motor 94, which is only used when the aircraft is on the ground, disconnects during normal operation from the engine of the turbomachine, which makes it possible to eliminate its rotation and therefore avoids any wear of its inner parts when its use is not required. Thus, its reliability is increased. Alternatively, the cost of its design can be lowered due to less wear of its inner parts.

FIG. 6 illustrates another exemplary embodiment according to the invention which substantially reproduces the general configuration of FIG. 2B (the references used in FIG. 2B are reproduced for the elements that are unchanged) and modifies the accessory gearbox 100 by axially offsetting the freewheel 64' to the outside of the pinion shaft 56*a*', still on the side of the second opposite end 56*a*2' of this shaft.

In this new configuration, the pinion shaft 56*a*' is elongated compared to the configuration of FIG. 2B (the length of the pinion shaft 56*a*' is identical to the length of the shaft 45 of FIG. 2A) and the freewheel 64' is positioned at the end of the shaft. The second wall 52*b*' of the casing is modified to form an external protrusion 102 (in the alignment of the shaft line L1) which extends axially away from the casing (and from the first wall 52*a*), which makes it possible to house, in this axial protrusion, the axial extension of the pinion shaft 56*a*' and the freewheel 64'. The second end 65*b*' of the fusible keel and decoupler assembly 65' is also modified to follow the offset of the freewheel 64' and is thus lengthened compared to the configuration of FIG. 2B**.

The elongation of the pinion shaft 56*a*' has the effect of moving the guide bearings p1 and p2 of this shaft away from each other, which are disposed at its two opposite ends 56*a*1 and 56*a*2'. This arrangement ensures better guidance for the axis of rotation of this shaft and therefore causes less wear on the straight toothings due to better parallelism between the axes of the pinion shafts.

Moreover, the axial offset of the freewheel 64' makes it possible not to increase the internal diameter of the pinion shaft dedicated to the starter, which makes it possible to limit its mass.

Such an arrangement can be envisaged without increasing the axial space requirement of the assembly of the accessory gearbox 100 and accessories equipping this gearbox insofar as the axial space requirement of the protrusion 102 is smaller than the axial space requirement of an accessory or equipment 104 mounted on another shaft line such as the line L2 parallel to the line L1, on the same second wall 52*b*' as that on which the axial protrusion 102 is shaped.

The axial space requirement of the assembly of the accessory gearbox 100 and accessories is denoted D in FIG. 6.

Although the present description refers to specific exemplary embodiments, modifications may be made to these examples without departing from the general scope of the invention as defined by the claims. Furthermore, individual characteristics of the various embodiments illustrated or mentioned may be combined in additional embodiments. Consequently, the description and drawings must be considered in an illustrative rather than restrictive sense.

The invention claimed is:

1. An accessory gearbox for an aircraft turbomachine, the accessory gearbox being configured to interface with a starter of the turbomachine intended to start up the turbomachine, the accessory gearbox comprising:
  a casing comprising first and second opposite walls, the first wall being intended to interface with the starter of the turbomachine,
  a reduction gear and a freewheel which are permanently integrated into the casing and dedicated to the starter of the turbomachine, and
  a shaft line in the casing which is dedicated to the starter and which includes a pinion shaft extending between the first and second opposite walls, in an axial direction perpendicular to the first wall, the pinion shaft including two opposite ends, a first end of which is disposed on a side of the first wall of the casing and a second end of which is disposed on the side of the second opposite wall of the casing, the freewheel dedicated to the starter being disposed in the casing on the side of the second end of the pinion shaft.

2. The accessory gearbox for an aircraft turbomachine according to claim 1, wherein the first wall of the casing includes an area which is intended to be crossed by an output shaft of the starter, the pinion shaft and the freewheel both being coaxial with respect to an axis passing inside this area of the wall.

3. The accessory gearbox for an aircraft turbomachine according to claim 1, wherein the freewheel is mounted inside the pinion shaft.

4. The accessory gearbox for an aircraft turbomachine according to claim 3, wherein the second opposite wall of the casing is externally equipped with a hand crank port disposed in an axial alignment with the shaft line dedicated to the starter and which is configured to allow, on command, when the turbomachine is stopped on the ground, a manual driving of a gear system internal to the casing.

5. The accessory gearbox for an aircraft turbomachine according to claim 4, wherein the hand crank port is connected to a driving shaft (74) connected to the freewheel dedicated to the starter.

6. The accessory gearbox for an aircraft turbomachine according to claim 5, comprising a rotating seal between the hand crank port and the driving shaft.

7. The accessory gearbox for an aircraft turbomachine according to claim 3, comprising inside the casing a transmission shaft extending axially inside the pinion shaft between a first end coupled to the reduction gear and a second opposite end which extends to the second opposite wall of the casing to be coupled to equipment external to the casing.

8. The accessory gearbox for an aircraft turbomachine according to claim 7, wherein the second opposite end (82*b*) of the transmission shaft is intended to be coupled to an oil pump external to the casing.

9. The accessory gearbox for an aircraft turbomachine according to claim 7, wherein the second opposite end of the transmission shaft is intended to be coupled to an electric motor external to the casing and which is dedicated to an operation of the turbomachine when the aircraft is on the ground.

10. The accessory gearbox for an aircraft turbomachine according to claim 1, wherein the freewheel is mounted outside the pinion shaft.

11. The accessory gearbox for an aircraft turbomachine according to claim 10, wherein the second opposite wall of the casing includes an external protrusion which extends axially away from the casing and which makes it possible to house the freewheel.

12. The accessory gearbox for an aircraft turbomachine according to claim 11, comprising at least one other shaft line which extends parallel to the axial direction of the shaft line of the starter and which is intended to interface with another accessory, the second opposite wall of the casing being intended to interface with this other accessory.

13. The accessory gearbox for an aircraft turbomachine according to claim 1, wherein the pinion shaft carries a web which is provided at its periphery with a toothing and which is disposed at a distance between the two opposite ends of the pinion shaft, the freewheel being disposed between the web and the second opposite wall of the casing.

14. The accessory gearbox for an aircraft turbomachine according to claim 13, wherein the web is disposed between the reduction gear and the freewheel.

15. The accessory gearbox for an aircraft turbomachine according to claim 1, wherein the reduction gear is disposed in the casing on the side of the first end of the pinion shaft.

16. The accessory gearbox for an aircraft turbomachine according to claim 15, wherein the reduction gear is disposed outside the pinion shaft.

17. The accessory gearbox for an aircraft turbomachine according to claim 16, wherein the reduction gear is disposed between the first end of the pinion shaft and the first wall of the casing.

18. The accessory gearbox for an aircraft turbomachine according to claim 17, wherein the reduction gear is coupled to a fusible member disposed inside the pinion shaft.

19. An assembly comprising an accessory gearbox for an aircraft turbomachine according to claim 1 and a starter interfacing with the gearbox, the starter comprising an output shaft disposed coaxially with the pinion shaft.

20. An aircraft turbomachine comprising an accessory gearbox for an aircraft turbomachine according to claim 1.

* * * * *